United States Patent [19]

Thimons et al.

[11] Patent Number: 4,666,492
[45] Date of Patent: May 19, 1987

[54] METHOD AND APPARATUS FOR SHAPING GLASS SHEETS

[75] Inventors: Edward A. Thimons, Tarentum; Robert G. Frank, Murrysville; Michael T. Fecik, Pittsburgh; George R. Claassen, New Kinsington; John J. Ewing, Tarentum; Samuel L. Seymour, Oakmont; Joseph C. Pavlik, Natrona Heights, all of Pa.

[73] Assignee: PPG Industries, Inc., Pittsburgh, Pa.

[21] Appl. No.: 807,630

[22] Filed: Dec. 11, 1985

[51] Int. Cl.⁴ .................................... C03B 23/023
[52] U.S. Cl. ...................................... 65/29; 65/104; 65/106; 65/273; 65/287; 294/65
[58] Field of Search ............... 65/104, 106, 107, 273, 65/286, 287, 29; 294/65

[56] References Cited

U.S. PATENT DOCUMENTS

| | | | |
|---|---|---|---|
| 2,123,549 | 7/1938 | Williams | 294/65 X |
| 3,389,984 | 6/1968 | Englehart et al. | 65/106 X |
| 4,200,420 | 4/1980 | Cathers et al. | 414/107 |
| 4,204,853 | 5/1980 | Seymour | 65/106 |
| 4,221,580 | 9/1980 | Frank | 65/273 |
| 4,227,908 | 10/1980 | Seymour | 65/106 |
| 4,228,886 | 10/1980 | Moran | 198/395 |
| 4,228,993 | 10/1980 | Cathers | 271/236 |
| 4,229,199 | 10/1980 | Seymour | 65/106 |
| 4,229,200 | 10/1980 | Seymour | 65/106 |
| 4,233,049 | 11/1980 | Seymour | 65/106 |
| 4,280,828 | 7/1981 | Seymour | 65/106 |
| 4,282,026 | 8/1981 | McMaster et al. | 65/273 |
| 4,285,715 | 8/1981 | Frank | 65/106 |
| 4,297,118 | 10/1981 | Kellar et al. | 65/104 |
| 4,298,368 | 11/1981 | Seymour | 65/25.2 |
| 4,360,374 | 11/1982 | Nitschke | 65/273 |
| 4,361,432 | 11/1982 | McMaster et al. | 65/104 |
| 4,364,766 | 12/1982 | Nitschke | 65/160 |
| 4,430,110 | 2/1984 | Frank et al. | 65/104 |
| 4,433,993 | 2/1984 | Frank | 65/104 |
| 4,437,871 | 3/1984 | McMaster et al. | 65/104 |
| 4,437,872 | 3/1984 | McMaster et al. | 65/104 |
| 4,517,001 | 5/1985 | McMaster | 65/273 |

Primary Examiner—Arthur Kellogg
Attorney, Agent, or Firm—Andrew C. Siminerio

[57] ABSTRACT

A heat softened glass sheet is lifted within a heating furnace by a vacuum pickup and moved to a shaping station adjacent the furnace where it is deposited on an aligning frame. The location of the sheet is identified and the frame is moved to position the supported glass sheet at a predetermined location between a pair of vertically aligned upper and lower full surface press faces. A shuttle frame which moves the vacuum pickup has integral vacuum passageways so that vacuum for the pickup can be drawn through the shuttle frame.

22 Claims, 12 Drawing Figures

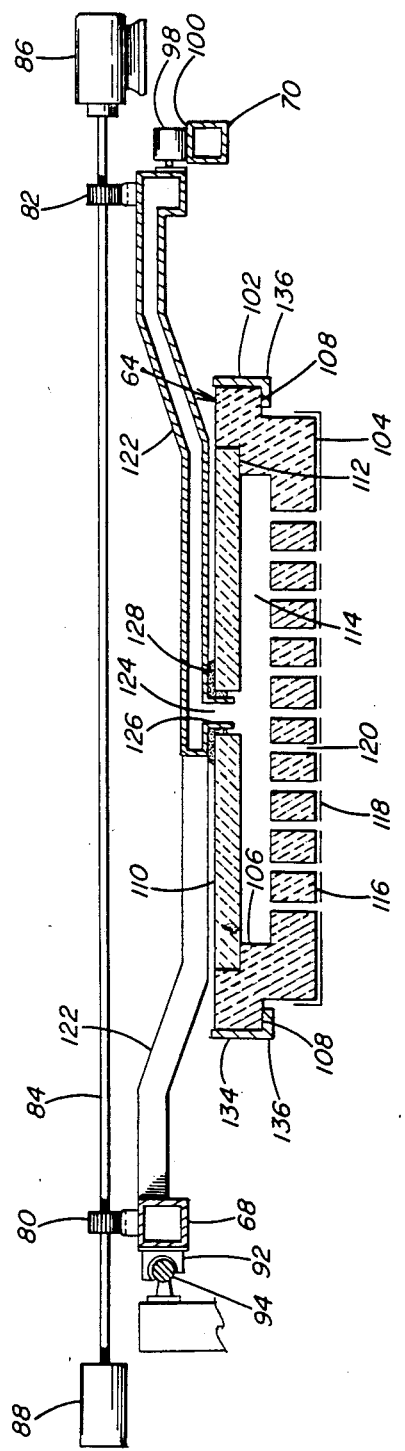
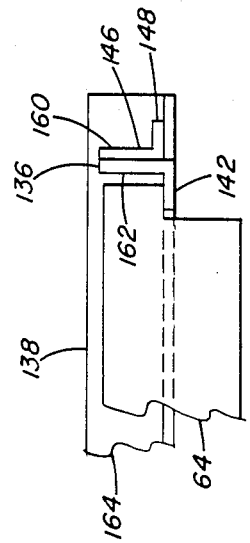
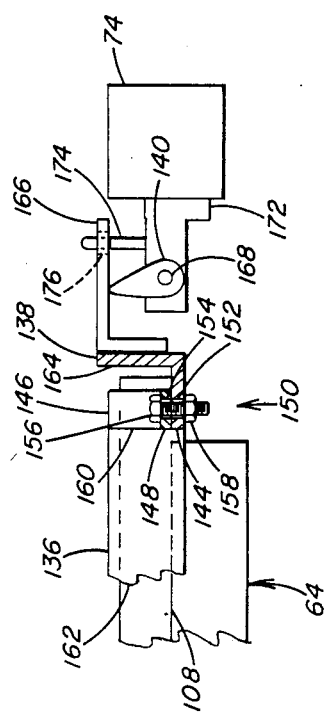
FIG. 4
FIG. 6
FIG. 5

METHOD AND APPARATUS FOR SHAPING GLASS SHEETS

BACKGROUND OF THE INVENTION

1. Field of the Invention

This invention relates to bending of glass sheets and, in particular, to a vacuum pickup, shuttle and positioning system to engage a glass sheet within a heating furnace, transfering the sheet to a sheet shaping station, and accurately aligning the sheet between a pair of vertically aliging full surface press faces at a shaping station prior to bending.

2a. Technical Considerations

Shaped and tempered glass sheets are widely used as side windows or rear windows in vehicles such as automobiles or the like and to be suitable for such applications flat glass sheets must be shaped to precisely defined curvatures dictated by the shape and outline of the frames defining the window openings into which the glass side or rear windows are installed. It is also important that the side or rear windows meet stringent optical requirements and that the windows be free of optical defects that would tend to interfere with the clear viewing therethrough in their viewing area.

During fabrication, glass sheets intended for use as shaped windows in vehicles are subjected to thermal treatment to temper the glass for strengthening the same and increase the resistance of the shaped window to damage resulting from impact. In addition to increasing the resistance of the glass sheet to breakage, tempering also causes the glass sheet to fracture into relatively small, smooth surfaced fragments that are less injurious than the relative large, jagged fragments that result from the breakage of untempered glass.

The commercial production of shaped glass sheets for such purposes commonly includes heating flat sheets to the softening point of the glass, shaping the heated glass to a desired curvature and cooling the bent sheets in a controlled manner to a temperature below the annealing range of the glass. During such treatment, a glass sheet is conveyed along a substantially horizontal path that extends through a tunnel-type furnace. The glass sheet is one of a series of sheets and is heated to its deformation temperature and transferred into a shaping station adjacent the furnace, where the glass sheet is pressed between upper and lower molds. The upper mold is generally a vacuum mold that holds the heat softened glass sheet by suction. At about the same time, a transfer and tempering ring having an outlined shape conforming to that desired for the glass sheet slightly inboard of its perimeter moves upstream into a position below the upper vacuum mold. Release of the vacuum deposits the glass sheet onto the tempering ring which supports the peripheral portion of the glass while it conveys the glass sheet into a cooling station for rapid cooling.

In prior art apparatus, glass sheets are lifted off the surface of conveying rolls and into engagement with the upper vacuum mold either by bottom segmented land press surfaces situated between conveying rolls, vertically reciprocating lifting fingers, or directly by suction from the vacuum mold. The segmented lower mold provides a discontinuous lifting and shaping surface. The upper contours of the lower segmented mold complement the shaping surface of the upper vacuum mold. The segmented bottom press surfaces may mark the lower surface of the glass sheet or may produce a ripple in the glass due to its discontinuous lifting and pressing surface. The vacuum mold is provided either with a lower rigidly curved shaping surface, a deformable shaping surface or a smooth flat shaping surface that lifts the flat glass sheet by suction thereagainst and depends on the release of the vacuum within the mold to permit the hot glass sheet to drop by gravity onto a tempering ring to develop the shape dictated by the outline configuration of the tempering ring. A process such as the latter is generally called drop forming.

When a flat glass sheet is shaped by drop forming, the maximum depth of bend attainable depends on the glass thickness, glass temperature and distance the glass has dropped. It is difficult to control the shape of thin glass sheets, particularly those heated to high temperatures.

Drop forming, using deformable molds, and other press bending systems employing lower segmented molds provide an efficient technique for generating cylindrical, compound, variable radii and localized configurations for simple and moderately complex patterns, where no dramatic bend geometries exist, but in order to pursue more complex geometries such as J-shaped bends, reverses, twists, sharp radii and deep localized bends, full surfaced pressing action is required. Full surface top and bottom pressing allows for complex shaping without the marking that may result from shaping with partial and discontinuous pressing surfaces.

It would be advantageous to develop a system whereby heated glass sheets could be transferred directly from the furnace to a shaping station with upper and lower full face bending molds. In addition, a system that would accurately position glass sheets within the shaping station would be desirable.

2b. Patents of Interest

U.S. Pat. Nos. 4,282,026; 4,361,432; 4,437,871; and 4,437,872 to McMaster et al. each teach a drop forming apparatus wherein a hot glass sheet is engaged within a heating furnace by a stationery upper vacuum pickup positioned above the furnace conveying rolls and subsequently is deposited on a shuttling carrier mold ring. The downwardly facing surface of the vacuum pickup can be planar or curved. The pickup can reciprocate vertically to engage the glass, or auxiliary lifters can be positioned between the furnace rolls and beneath the hot glass sheet to lift the glass for engagement with the vacuum pickup. The ring moves beneath the vacuum supported glass sheet and the vacuum is terminated to drop the hot glass sheet on the ring and effect shaping. The ring subsequently shuttles from its pickup transfer station to a quench unit that rapidly cools the shaped glass. Throughout the operation, the vacuum pickup remains horizontally stationary within the furnace and the glass is transferred directly to a ring mold.

U.S. Pat. Nos. 4,227,908; 4,229,199; 4,229,200; 4,233,049; and 4,280,828 to Seymour teach shaping glass sheets by drop forming. A heat softened glass sheet exits a furnace and is positioned on a support bed below a stationary flat vacuum pickup. The pickup lifts the glass sheet and moves upward to allow a contoured shaping ring to be positioned under the sheet. Vacuum is disengaged and the sheet drops on the ring. The force generated by the impact of the glass sheet on the ring provides the bending force required to shape the sheet and conform it to the contours of the ring. The patents also teach the use of auxiliary shapers to impart additional contours in the glass sheet.

U.S. Pat. Nos. 4,221,580; 4,285,715; and 4,433,993 to Frank and No. 4,430,110 to Frank et al. teach a horizontal press bending operation wherein heated glass sheets enter a shaping station and are lifted off the run-in conveyor rolls by a slotted lower mold. The glass sheet is pressed between the slotted lower mold and a shaped upper vacuum mold. After pressing, the lower mold is retracted to a position beneath the run-in rolls. A shuttling tempering ring is positioned below the vacuum mold and the vacuum is released so that the shaped glass is deposited onto the tempering ring. The ring subsequently transfers the shaped glass to a quenching station to temper the bent glass sheet. The upper vacuum mold can reciprocate vertically but is horizontally stationary.

U.S. Pat. No. 4,297,118 to Kellar et al. teaches a shuttling deformable vacuum mold that engages a heated glass sheet within a heating furnace. While still in the furnace, the mold deposits the shaped glass sheet on a shuttling tempering ring that is positioned beneath the mold. After depositing the glass, the vacuum mold shuttles to a position outside of the furnace to cool prior to reentering the furnace to engage the next glass sheet. The tempering ring transfers the glass sheet from the furnace to a quenching station to temper the glass.

U.S. Pat. No. 4,517,001 to McMaster teaches the use of a traveling vacuum holder with a downwardly facing engaging surface to lift a heated glass sheet and transfer the sheet onto a carrier ring mold within the heating furnace wherein the heated glass sheet is bent under the force of gravity on the mold. The bent glass sheet is subsequently removed from the furnace to a quench unit to temper the bent glass.

U.S. Pat. Nos. 4,200,420 to Cathers et al. and 4,228,993 to Cathers teach a glass sheet orienting and transporting frame for use with an industrial robot. The frame includes a plurality of sheet locating arms. The frame is positioned above the sheet and the arms locate edge portions of the sheet. The frame thereafter moves the sheet and orients it in a predetermined position. The locating arm moves away from the oriented sheet which is thereafter engaged by the frame and moved away from the sheet orienting area.

U.S. Pat. Nos. 4,204,853 and 4,298,368 to Seymour teach alignment devices for positioning glass sheets on a hot gas support bed adjacent the exit end of a furnace. Rotating conveyor rolls move the glass sheet over the support bed and urge it into contact with a locating frame. The frame is contoured to conform to the curvature of a portion of the leading edge of the glass sheet. After alignment the glass sheet is shaped.

U.S. Pat. No. 4,228,886 to Moran teaches a position sensor wherein a pair of sensors, each with multiple energy sources, e.g., a light source, direct the light source at a major surface of a glass sheet positioned thereunder. A portion of the light directed at the sheet does not contact the sheet while another portion of the light makes contact with and is reflected from the sheet. The reflected light passes through a lens and strikes a photo detector. Based on the amount of light that strikes the detector, the portion of the sheet reflecting the light from each sensor can be calculated and the overall orientation of the sheet can be determined.

U.S. Pat. No. 4,364,766 to Nitschke teaches a microprocessor based control system for monitoring and controlling pairs of hot glass sheets as they are conveyed through a heating, bending and tempering operation. The glass is conveyed through a heating furnace and as the glass pairs approach an overhead vacuum pickup in the furnace, a photo electric sensor provides a glass sensing signal to a control computer that controls the rotational velocity of different sets of furnace conveyor rolls. By controlling the roll speeds, the distance between adjacent sheets of glass pairs can be established for engagement with the vacuum pickup.

U.S. Pat. No. 4,360,374 to Nitschke teaches a glass sheet alignment system whereby the roller conveyor in the vicinity of a vacuum holder includes a roll shifter to shift sets of conveying rolls along the direction of the glass sheet conveyance. The set of rolls is shifted in the direction opposite to the direction of conveyance to reduce sliding of the glass sheet with respect to the vacuum holder as the glass sheet is engaged by the holder. In another embodiment, the conveying rolls near the vacuum holder are driven by a drive separate from the remaining rolls of the conveyor and independently controlled, to position the glass. Both arrangements align the glass sheet beneath the vacuum holder to reduce the relative movement of the hot glass sheet immediately prior to its engagement with the vacuum holder.

SUMMARY OF THE INVENTION

An object of this invention is to provide a glass sheet positioning and shaping apparatus. A vertically reciprocating vacuum pickup suspended on a shuttle frame engages a heat softened glass sheet within a furnace and moves the glass sheet out of the furnace to a shaping station. The sheet is deposited on a slide frame at the shaping station. A positioning system locates the position of the glass sheet on the slide frame and moves the slide frame with the glass sheet thereon to align the sheet in a predetermined position. The slide frame includes a fiberglass cloth to support the heat softened glass sheet. The shuttle frame includes a hollow support frame and connecting arms to provide a continuous passageway from the vacuum pickup to the support frame. The shuttle frame is expandable to avoid warping due to thermal cycling as it moves from the furnace to the shaping station.

Another object of this invention is to provide a method of shaping a glass sheet. The glass sheet is heated in a furnace and engaged by a vacuum pickup. The sheet and pickup are transferred out of the furnace to a shaping station where the sheet is deposited and aligned to correctly position the sheet between vertically aligned upper and lower press faces at the shaping station. The sheet is deposited on a support frame and the alignment includes locating the position of the glass sheet on a support frame and moving the frame with the glass sheet thereon to position the sheet at a predetermined position.

BRIEF DESCRIPTIONS OF THE DRAWINGS

FIG. 4 is a cross-sectional view taken along line 4—4 of FIG. 3 illustrating the vacuum platen pickup and shuttle drive.

FIG. 5 is a view taken along lines 5—5 of FIG. 3 illustrating the vacuum platen pickup support frame and lifting cams.

FIG. 6 is a view taken along line 6—6 of FIG. 3 illustrating the vacuum platen pickup support frame.

DETAILED DESCRIPTION OF THE INVENTION

Figure 1:
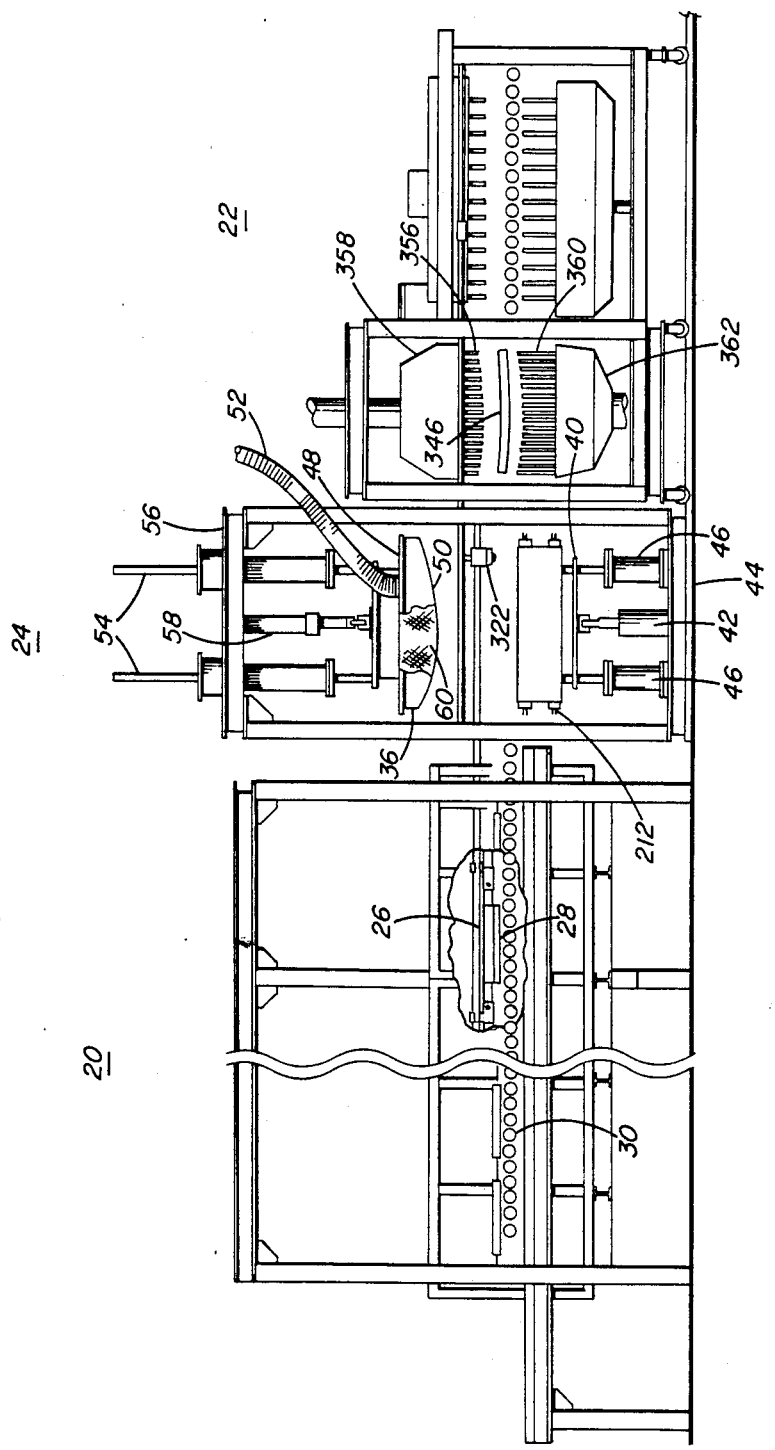
FIG. 1 is an elevational view of the invention showing a preferred embodiment of the furnace, bending station, and cooling station.
Figure 2:
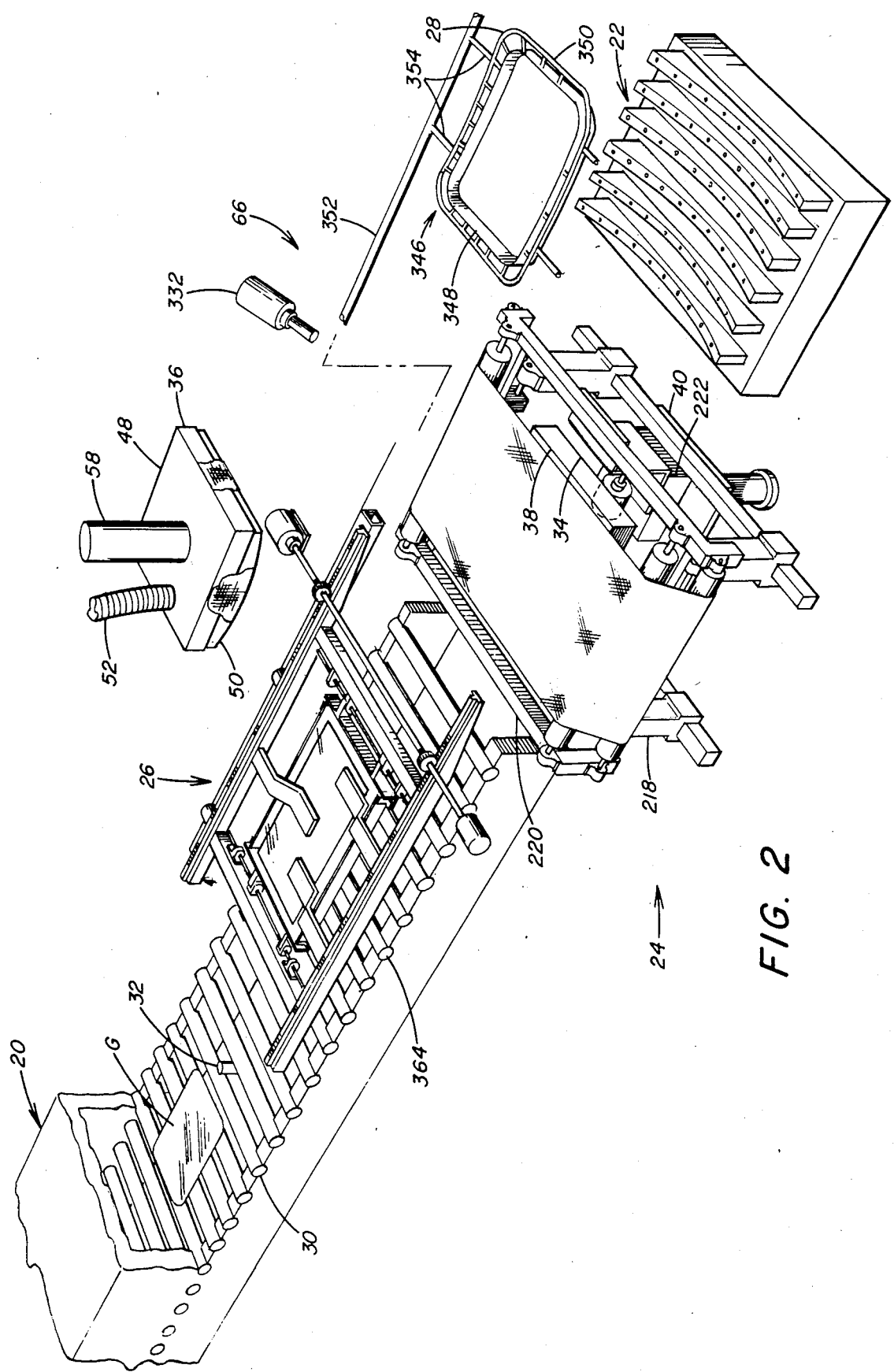
FIG. 2 is an isometric schematic view of the invention illustrating the vacuum platen shuttle arrangement and vision sensor positioning system.

Referring to FIGS. 1 and 2, an apparatus for heating and shaping sheets of materials such as glass, includes a furnace 20 through which sheets of glass are conveyed while being heated to the glass deformation temperature. It should be appreciated that although in the preferred embodiment, the sheet material is glass, the invention is not limited to glass and can be used with other heat softenable, deformable materials. A cooling station generally indicated at 22 for cooling the curved sheets of glass and an unloading station (not shown) is located beyond the cooling station 22 to the right of the furnace 20 as shown in FIGS. 1 and 2. A shaping station 24 is disposed between the furnace 20 and the cooling station 22. A retrieval/positioning system 26 transfers heated glass sheets from the furnace 20 and positions it in the shaping station 24. A sheet transfer means 28, shown only in FIG. 2, located in the cooling station 22 transfers the shaped glass sheets from the shaping station 24 to the cooling station 22.

Heat may be supplied to the furnace 20 in any convenient manner, e.g., from gas burners or by electrical radiant heaters, or by a combination of both, which heat supply means are well known in the art. The furnace 20 includes a horizontal conveyor comprising longitudinally shaped transversely extending conveyor rolls 30 that define a path of travel which extends through the furnace 20. The conveyor rolls 30 may be arranged in sections so that the speed of the different conveyor sections may be controlled and synchronized, in a manner well known in the art, for proper movement and positioning of glass sheets through the furnace 20. A glass sensing element 32 is located within the furnace 20 to initiate a cycle of operation for bending.

The glass sensing element 32, electronic limit switches, and various timer circuits are provided to synchronize the operation of various elements of the bending operation according to a predetermined sequence.

Figure 3:
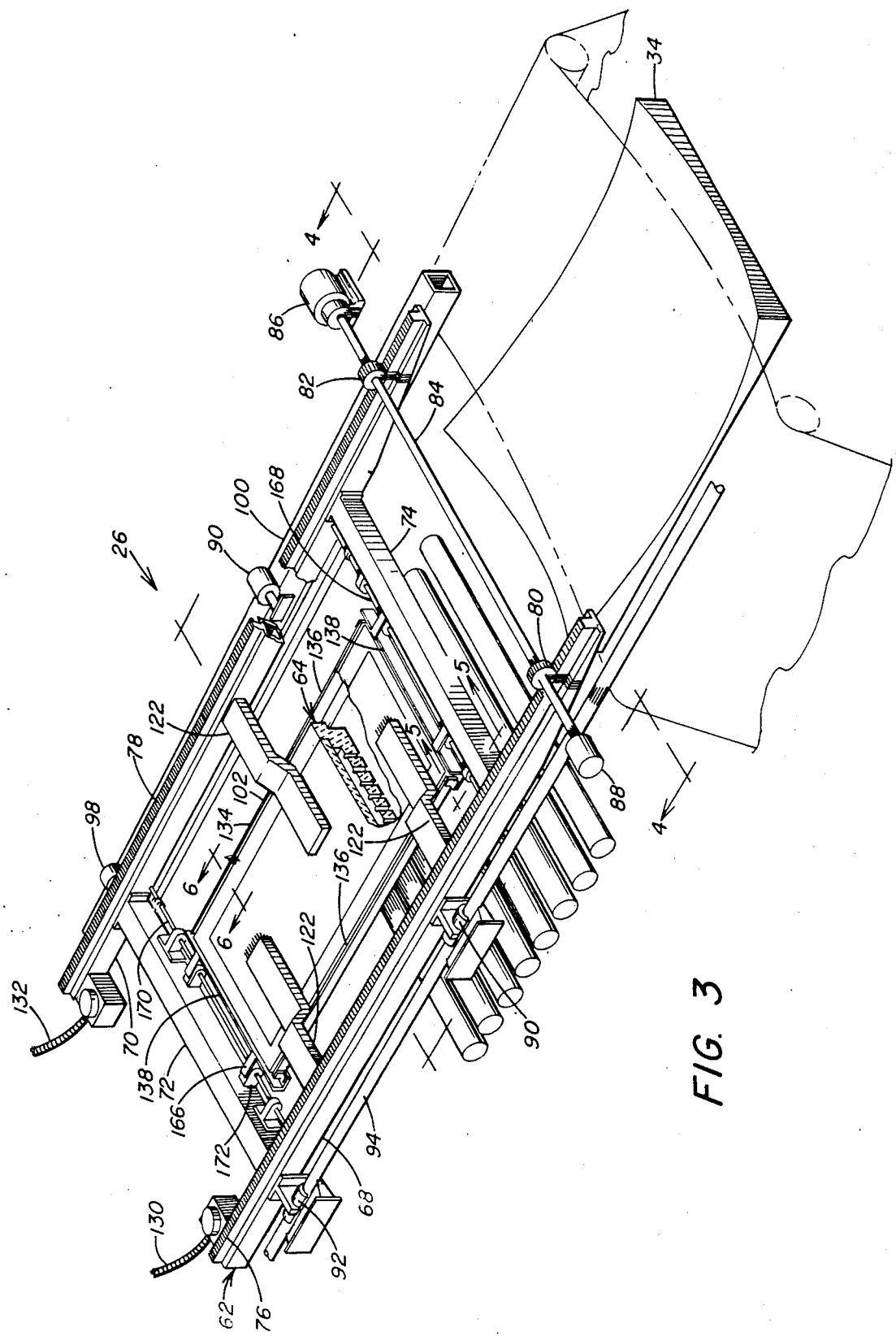
FIG. 3 is an isometric view of the vacuum platen shuttle arrangement, with portions removed for clarity.

The shaping station 24 is comprised of a lower mold 34, shown in FIGS. 2 and 3, and an upper mold 36, shown in FIGS. 1 and 2. The lower mold 34 is a full surface mold with an upper pressing face 38 conforming in shape to the shape desired for the glass sheet to be bent. The lower mold 34 is fixed to a lower mold support platform 40 operatively connected to piston 42 for vertically reciprocating movement. The platform 40 is connected to a lower frame 44 as shown in FIG. 1 through lower vertical guide rods 46. The upper surface 38 of the lower mold 34 is preferably smoothly surfaced to avoid imparting any irregularities in the glass sheet surface and, although not limiting to this invention, is preferably composed of steel, meehanite, or a ceramic composite. This material provides a smoothly surfaced contour and good durability despite intermittent contact with hot glass that causes rapid cyclic temperature variations over an extended period.

The upper mold 36 has an upper mounting plate 48 and an apertured lower press face 50. The press face 50 is shaped to be slightly less sharply bent than the shaping surface formed by the upper surface 38 of the lower mold 34. The upper vacuum mold 36 communicates through an evacuation pipe 52 with a vacuum source (not shown). Referring to FIG. 1, the upper vacuum mold 36 is suitably connected through upper vertical guide rods 54 to an upper supporting frame 56 and is moveable relative thereto by an upper vertical piston 58. The evacuation pipe 52 may be connected through a suitable valve arrangement to a source of pressurized air (not shown) and the valves for the vacuum and pressure line may be synchronized according to a predetermined time cycle in a manner well known in the art. The upper mold 36 is preferably composed of steel, meehanite, or a ceramic composite covered with a refractory material 60 such as fiberglass as is well known in the art.

The upper and lower molds are reinforced to ensure that, if required by the shaping operation, the pressing action of the molds is Perpendicular to the path of travel of the glass sheet to be shaped therebetween and that the press faces 38 and 50 remain parallel to each other.

Referring now to FIG. 3, in order to transfer heat softened glass sheets from the exit end of the furnace 20 to the shaping station 24, the present invention uses the retrieval/positioning system 26 that includes a shuttle frame 62 to move a vacuum platen pickup 64 from a park position within the exit end of the furnace 20 to an unload position between the lower mold 34 and upper vacuum mold 36 of the shaping station 24 and a vision sensor positioning system 66, to be discussed later.

The shuttle frame 62 includes a pair of longitudinally extending support beams 68 and 70 interconnected by cross braces 72 and 74. The beams 68 and 70 are hollow to supply vacuum to the platen pickup 64 as will discussed later. Fine tooth drive racks 76 and 78 are fixed to the top surface of the beams 68 and 70 and engage drive sprockets 80 and 82 respectively. Sprockets 80 and 82 are mounted on a common drive shaft 84 which is driven by motor 86. Although not limiting to this invention, the motor 86 is preferably a D.C. motor with reducer. Counter 88 mounted on shaft 84 monitors its rotation to provide accurate Positioning of the shuttle frame 62 as will be discussed later. Front guide 90 and rear guide 92 are mounted on the beam 68 and slidably engage guide shaft 94 which parallels the beam 68. The guide shaft 94 is mounted to the bending assembly frame (not shown) and limits the movement of the shuttle frame 62 to the direction in which the glass sheet is conveyed through the furnace 20. Front roller 96 and rear roller 98 are mounted on the beam 70 and positioned to ride over roller guide track 100.

Because the shuttle frame 62 is exposed to high thermal conditions and extreme thermal cycling, i.e. movement from its parked position in the furnace 20 to the unload position in the shaping station 24 and back again, it is subject to stress conditions that may tend to bend and warp the frame 62. The arrangement of the preferred shuttle frame 62 overcomes this by providing free expansion capabilities. The only fixed reference location relative to the shuttle frame 62 is the guide shaft 94. The frame 62 can expand longitudinally without warping or binding because the front guide 90 and rear guide 92 on the beam 68 and the front roller 96 and rear roller 98 on the beam 70 can each move longitudinally relative to each other. In addition, since the rollers 96 and 98 move in the track 100 and are not restricted in a lateral direction, the shuttle frame 62 can expand or contract laterally without warping or binding.

The vacuum platen pickup 64 is positioned on a free hanging frame 102 between the beams 68 and 70 and cross braces 72 and 74 so that it can move vertically, independent from the shuttle frame 62. As shown in FIG. 4 the platen pickup 64 includes a flat lower apertured wall 104, side walls 106 and an outer perimeter ledge 108. Lid 110 rests on seat 112 of the side walls 106 to form an enclosed chamber 114 through which vacuum is drawn in a manner to be discussed below. Although not limited in this invention, the lower wall 104 is preferably, made of either ceramic material or meehanite cast iron. In either instance, face 116 of the lower wall 104 is covered with a heat resistant, non-reactive, insulating, smooth surfaced material 118, such as Kaowool ®2600 paper available from Babcock and Wilcox. The material 118 is glued to the face 116 with an adhesive that has thermal expansion properties similar to that of the lower wall 104. Holes are then bored through the material 118 to be aligned with the apertures in the lower wall 104 to provide passageways 120 through which vacuum is drawn. Other materials such as graphite, metal oxides, boron nitride, and alumina and silica papers also have been used to coat or cover the face 116 of the platen pickup 64. The cover material 118 helps insulate the glass sheet G from the pickup 64 to reduce heat loss and permit a lower exit temperature of the glass sheet G from the furnace 20.

It should be noted that although the preferred vacuum platen pickup 64 is a flat pickup, a deformable vacuum pickup similar to the deformable vacuum molds in U.S. Pat. Nos 4,297,118 and 4,430,110 which teachings are hereby incorporated by reference, could be used to preform the heated glass sheet prior to final bending.

As shown in FIG. 4, the preferred embodiment of the invention includes connecting arms 122 that extend inwardly from the beams 68 and 70 of the shuttle frame 62 over the lid 110 of the platen pickup 64. The arms 122 are hollow with opening 124 and extended neck section 126 to provide vacuum passage between the chamber 114 and the beams 68 and 70. Heat resistant material 128 can be packed between the connecting arm 122 and the lid 110 as well as around the neck section 126 to help reduce vacuum leakage. The connecting arm 122 is vertically spaced from the lid 108 and the neck section 126 is slidably positioned within the lid 108 to allow for vertical movement of the vacuum platen pickup 64 during operation, as will be discussed later. As an alternative, the connecting arm 122 can be made flexible at its connection with the beams 68 and 70 such as by using spring steel, spiral wrapped, heat resistant rubber, so that the neck section 126 can be fixed to the lid 108 while the connecting arm 122 flexes to allow for vertical movement of the platen pickup 64.

Vacuum is drawn through the passageways 120 of the apertured wall 104, through neck section 126 which extends into chamber 114, through the connecting arm 122, through the beams 68 and 70 and out vacuum hookups 130 and 132. The dead weight of the lid 110 as well as a closing action resulting when the vacuum is drawn, helps seal the upper edge of the chamber 114. This arrangement of directing the vacuum through the shuttle frame 62 allows the vacuum hookups 130 and 132 to be connected outside of the furnace 20 so that they are not exposed to high temperature conditions or thermal cycling. Furthermore, any thermal degradation of the vacuum actuators or valves is reduced.

Referring to FIGS. 4, 5, and 6 as required, the free hanging frame 102 includes a rectangular frame 134 composed of a pair of longitudinally extending support angles 136 and a pair of laterally extending support angles 138 suspended from lifting cams 140. The angles 136 and 138 each have an inwardly extending leg portions 142 and 144 respectively, to support the perimeter ledge 108 of the platen pickup 64. As illustrated in FIGS. 5 and 6 the angles 136 and 138 are interconnected at the corners of the rectangular frame 134 by angles 146. Horizontal leg portion 148 of the angle 146 is secured to leg portion 144 of the laterally extending support angle 138 by bolt assembly 150. Hole 152 through leg portion 144 and hole 154 through leg portion 148 are sized larger than the diameter of bolt 156 so as to allow slippage at the corners of the frame 102 as it expands and contracts due to cyclic heating. Nut 158 is welded to the lower face of leg portion 144 to prevent it from falling off and damaging a conveyor roll. Vertical leg portion 160 of the angle 146 is secured to vertical leg portion 162 of the longitudinally extending support angle 136. Vertical leg 164 of each of the angles 138 is fitted with frame support angles 166 which ride on the lifting cams 140. Each pair of cams 140 are interconnected by a common cam shaft 168 and 170, supported by blocks 172 which are mounted to cross braces 72 and 74 respectively. An alignment pin 174 extends upwards from the block 172 and through a hole 176 in the support angles 166 so that the movement of the vacuum platen pickup 64 and free hanging frame 104 remains generally vertical.

Figure 7:
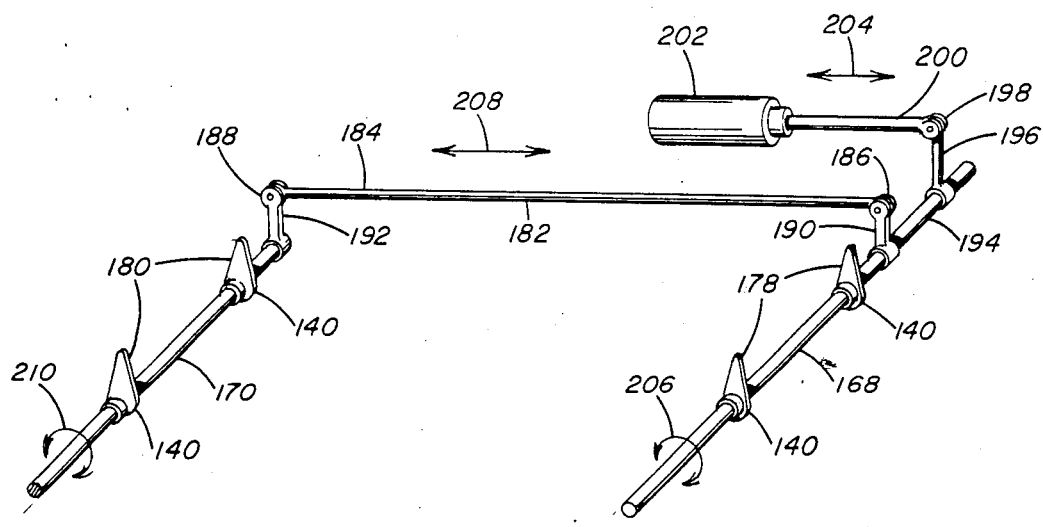
FIG. 7 is an isometric schematic view of the hydraulic circuit controlling the rotating cams.

As shown in FIG. 7, the cams 140 are part of a hydraulic circuit that rotates all the cams 140 simultaneously in the same direction. Cam pair 178 on cam shaft 168 and cam pair 180 on the cam shaft 170 are interconnected by linkage 182 that includes horizontal rod 184 pinned at joints 186 and 188 to rotating arms 190 and 192, respectively. The opposite ends of the arms 190 and 192 are fixed to the cam shafts 168 and 170, respectively. Extension 194 of the cam shaft 168 is connected to rotating arm 196 which in turn is pinned at connection 192 to hydraulic link arm 200. Hydraulic cylinder 202 engages the link arm 200 and drives it forward and backward as indicated by arrow 204. This action pivots the arm 196 linked to the cam shaft 168 and causes it to rotate as indicated by arrow 206. The linkage 182 which is also connected to cam shaft 168, moves as indicated by arrows 208 and causes cam shaft 170 to rotate as indicated by arrow 210.

In the preferred embodiment, each cam 140 is positioned in the same orientation relative to the cam shafts 168 and 170. As a result, when the hydraulic cylinder 202 is activated and the cams 140 rotate, the free hanging frame 102 supporting the platen pickup 64 moves vertically an equal amount at each support. As can now be appreciated, the vacuum platen pickup 64 can be made to tilt. Cams of different configurations can be used at each support so that as the cam shafts rotate, each corner moves a different amount. In addition, spacers can be inserted between the support angles 168 and blocks 172, preferably at selected alignment pins 174 to limit the downward movement of the frame 102 at a particular support. Furthermore, the cams 140 can be oriented at different degrees of rotation so that as the cams 140 rotate simultaneously, one cam or one Pair of cams will raise or lower the frame 102 a different amount from the other cam or pair of cams. A fourth alternative includes connecting each cam or pair of cams with individually controlled hydraulic circuits.

Figure 9:
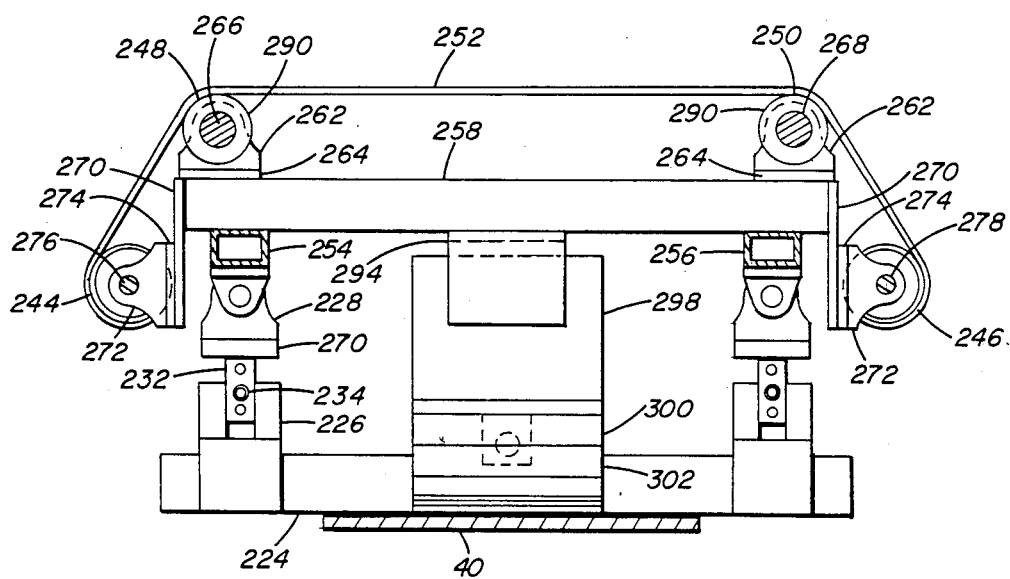
FIG. 9 is a cross-sectional view taken along line 9—9 of FIG. 8 illustrating the hammock material support rolls and the guide rails with supports.
Figure 8:
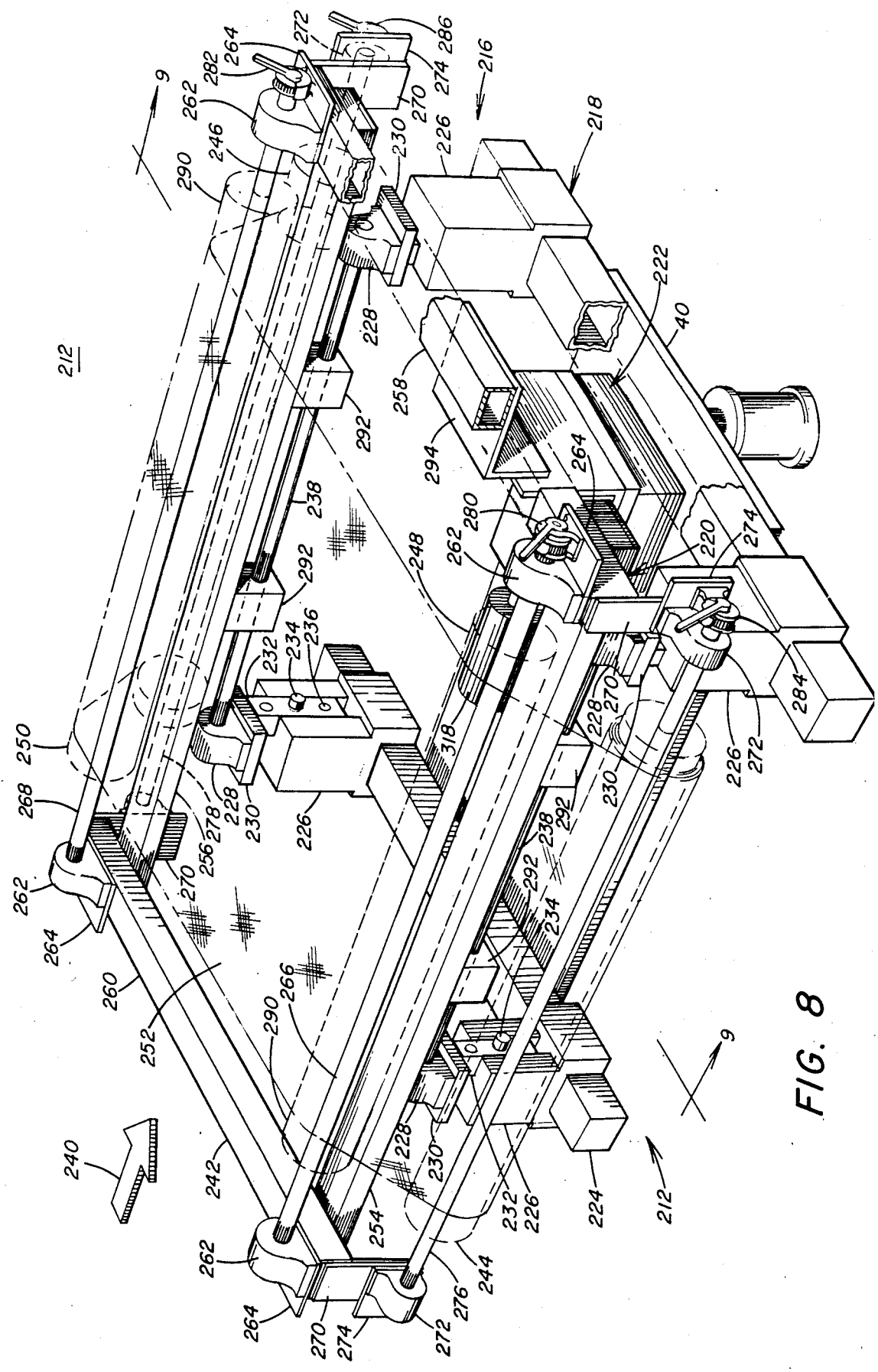
FIG. 8 is an isometric view of the positioning frame of the vision sensor positioning system, with portions removed for clarity.
Figure 11:
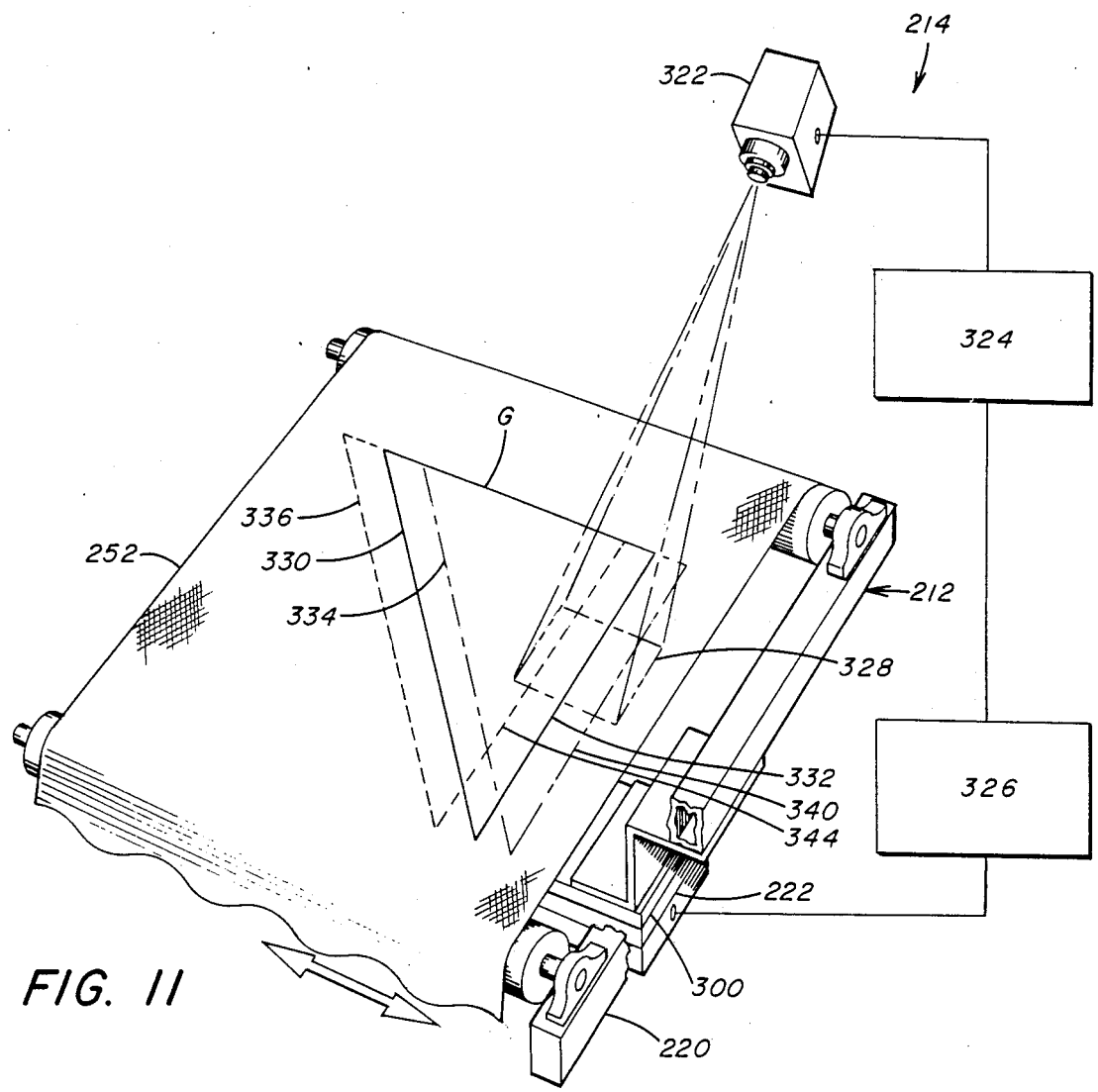
FIG. 11 is an isometric schematic view of the vision sensor positioning system illustrating various positions of the glass sheet to be shaped on the hammock material.

The vision sensor positioning system 66 as shown in FIGS. 8, 9 and 11 is located at the shaping station 24 to enhance the in-press positioning accuracy of the retrieval/positioning system 26 as it deposits heated glass sheets from the furnace 20 at the shaping station 24 for shaping, and includes a glass sheet positioning frame 212 and a vision sighting setup 214 as shown in FIG. 11. The positioning frame 212 includes a carriage 216 mounted on the lower mold support platform 40 such that portions of the carriage 216 can move longitudinally along the axis defined by the direction in which the glass sheets are conveyed. The carriage 216 includes a guide rail and carriage support assembly 218, a hammock support assembly 220 and a carriage slide assembly 222. The carriage support assembly 218 includes transverse cross beams 224 are rigidly mounted to the platform 40 and support four corner posts 226. Each corner post 226 supports a guide rail pillow block 228 on a vertically adjustable pedestal 230. The posts 226 are channeled to receive finger members 232 of the pedestal 230 for vertically slideable movement therein. The pedestal 230 can be vertically secured in position in any well known manner such as a set screw 234 inserted through one of the apertures 236 in the finger member 232 and into a bore (not shown) in the corresponding post 226. Each pair of pillow blocks 228 supports opposite ends of a carriage guide rail 238. The guide rails 238 are parallel to each other and extend in the longitudinal sliding direction of the carriage 216 as indicated by arrow 240.

The hammock support assembly 220 which slides relative to the guide rail and carriage support assembly 218 includes an upper rectangular frame 242 to support a hammock supply roll 244, a hammock take-up roll 246 and a pair of hammock stretching rolls 248 and 250. The hammock material 252 which is a high heat resistant fabric that will not react with or mark hot glass sheets supported thereon, is stretched from the supply roll 244 over the stretching rolls 248 and 250 to the take-up roll 246. Although not limited in this invention, the hammock material 252 is preferably a fiberglass cloth. The upper frame 242 is constructed of longitudinal struts 254 and 256 connected by transverse cross beams 258 and 260. Bearing blocks 262 positioned on mounting plates 264 at the corners of the rectangular frame 242 provide rotational support at the ends of shafts 266 and 268 of the hammock stretching rolls 248 and 250 respectively. The supply roll 244 and take-up roll 246 are suspended from the corners of the rectangular frame 242 by vertical mounting plates 270. Bearing blocks 272 are bolted to mounting plates 274 on plates 270 to provide rotational support at the ends of shaft 276 of the supply rolls 244 and shaft 278 of the take-up roll 246. Rolls 244, 246, 248 and 250, along with carriage guide rails 238, are preferably all aligned prallel to each other.

One end of each stretching roll shafts 266 and 268 extend through the bearing block 262 and is fitted with a releasable ratchet assemblies 280 and 282 mounted on the mountihg plate 264 to restrict the rotation of each stretching roll 248 and 250 to only one direction, respectively. One end of shafts 276 and 278 are similarly provided with a ratchet assemblies 284 and 286, respectively, to restrict rotation of the supply roll 244 and take-up roll 246. With specific reference to FIGS. 8 and 9, in order to maintain the hammock material 252 taut, take-up roll 246 and support roll 250 are biased in a clockwise direction, while supply roll 244 and support roll 248 are biased in a counterclockwise direction to stretch and tension the material 252. The respective ratchet assemblies prevent each roll from rotating in a direction to relieve the tension. If required, surface 290 of the support rolls 248 and 250 can be roughened or coated with a gritty material to help grip and stretch the hammock material 252. In the preferred operation of the apparatus, the hammock material 252 is stretched to make the glass supporting portion 288 as flat as possible for reasons to be discussed later.

Rail guides 292 are mounted on the underside of struts 254 and 256 to slidably engage the rails 238 so that any longitudinal movement of the hammock support assembly 220 will be in the direction of the rails 238.

Figure 10:
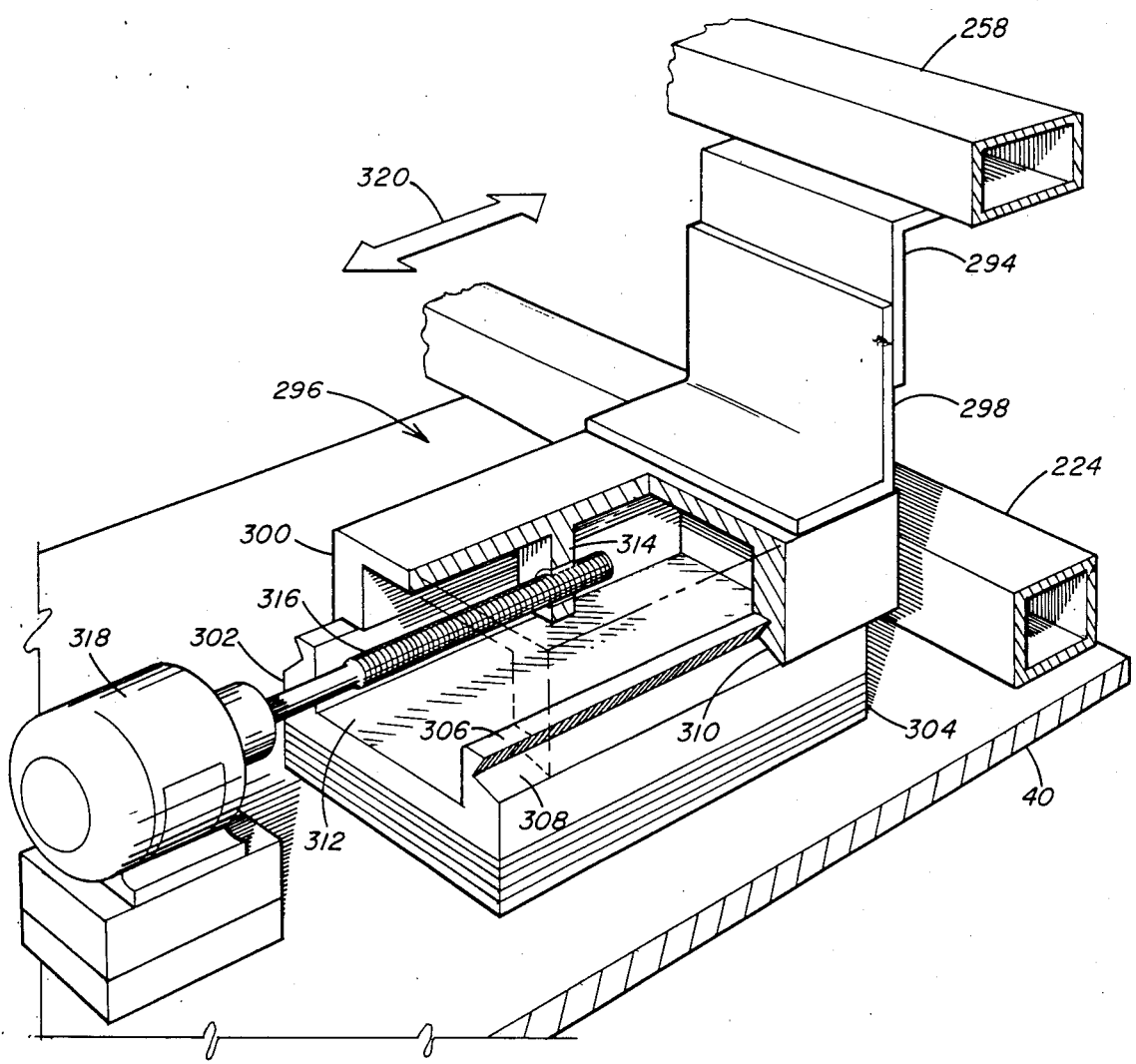
FIG. 10 is a cut-away isometric view of the carriage slide assembly for the hammock support assembly.

The carriage slide assembly 222 as shown in FIGS. 8 and 10 slidably moves the hammock support assembly 220 over the stationary guide rail and carriage support assembly 218. The slide assembly 222 is connected to cross beam 258 of the hammock support assembly 220 by angle member 294 which is secured to slide block assembly 296 via bent plate 298. With specific reference to FIG. 10, the slide block assembly 296 includes an upper plate 300 secured to the bent plate 298 and a lower plate 302 fixed to the lower support platform 40 through shims 304. Sliding surface 306 of the lower plate 302 ihcludes longitudinally extending interlocking grooves 308 which mate with the contours of sliding surface 310 of the upper plate 300 to prevent the plates from vertically separating while allowing them to slide relative to each other. A cavity 312 is positioned between plates 300 and 302, extending in the sliding direction of the upper plate 300. Threaded nut 314 is fixed within upper surface of the cavity 312 to the upper plate 300 and spaced from the lower surface of the cavity 312 at lower plate 302. A threaded shaft 316 extending from a drive 318, which is fixed to the lower plate 302 or the platform 40, passes through and engages the nut 314 so that as the threaded shaft 316 rotates within the threaded nut 314, the upper plate 300 slides in a linear direction relative to the lower plate 302 as indicated by arrow 320.

It should be noted that while the present invention employs a sliding arrangement that moves the glass sheet positioning frame 212 in a longitudinal direction, an arrangement that would also provide lateral adjustment and rotational adjustment about a vertical axis could be used and in light of the present disclosure such an arrangement would be obvious to one skilled in the art.

With reference to FIG. 11, the vision sighting setup 214 of the vision sensor positioning system 66 is employed to physically locate a glass sheet that is on the hammock support assembly 220 and control the carriage slide assembly 222 to move the hammock supported glass sheet to a predetermined position between the pressing molds in the shaping station 24. The setup 214 includes a solid state video camera 322 linked to a vision system programmable computer and controller 324. The camera 322 is positioned such that it can view a generally transversely extending edge of a glass sheet deposited on the hammock support assembly 220. The camera 322 has a preferred array of approximately 250 by 250 picture elements or pixels. Each pixel is one point in the viewing array and is viewed as either a black or a white image. In the preferred embodiment, the leading edge of the glass sheet G to be shaped is illuminated such that the pixels are covered by the glass sheet are viewed as black while the uncovered pixels are viewed as white. In an alternate embodiment, the camera 322 can be used to locate the glass sheet by detecting infrared radiation radiating from the heated glass sheet.

In operation, a home position representing the proper location for a reference point on the glass edge is established in the pixel array. As each successive glass sheet is deposited on the hammock material 252 and the vacuum shuttle frame 62 moves out of the camera 322 viewing area and back into the furnace 20, the camera 322 takes an instantaneous picture of the glass edge showing the location of the reference point. This information is sent to the programmable computer and controller 324 which compares the actual position of the reference point to the home position and calculates the distance the glass sheet must be moved in the sliding directing of the hammock support assembly 220 to be properly aligned. The computer and controller 324 then sends a signal through a signal amplifier 326 to the drive 318 which moves the upper plate 300 of the carriage drive assembly 222 forward or backward to properly position the glass sheet. The viewing of the glass sheet G and movement of the hammock support assembly 220 occurs before or while the upper and lower molds are moving towards one another, depending on the amount of movement required to align the glass sheet G, and is completed prior to the actual pressing operation. After the shaped glass sheet is lifted off the hammock 252 by the upper vacuum mold 36, the carriage slide assembly 222 slides back to its original position and the vision sensor positioning system 66 is reset for the next glass sheet.

Figure 12:
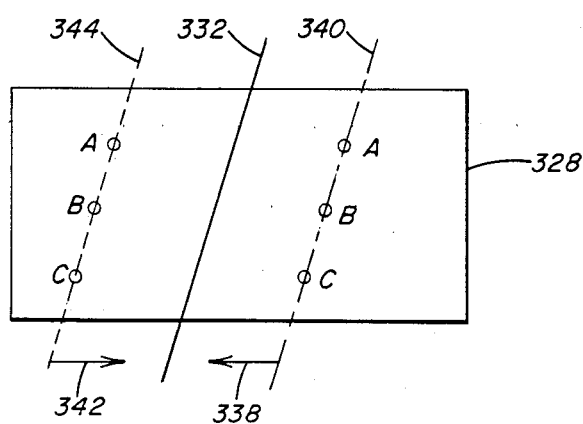
FIG. 12 is an enlarged plan view of the viewing window of the camera of the vision sensor positioning system illustrating various positions of the leading edge of the glass sheet to be shaped.

In the preferred operation of the positioning system 66, the viewing area of the camera 322 is limited to a 1½" by ¼ (3.81 cm by 0.64 cm) longitudinally extending viewing window 328 as shown in FIG. 12. In addition, three references points A, B, and C are viewed by the camera 322 to position the glass sheet. After the camera 322 takes a picture of the glass sheet edge, the pixel positions for each point is located and these positions are averaged. This average position is compared to the predetermined home position to determine the amount of sliding movement required by the carriage slide assembly 222. Referring to FIGS. 11 and 12, reference outline 330 with leading edge 332 illustrates the predetermined home position, with a glass sheet 334 located slightly upstream and the glass sheet 336 slightly downstream from the home position. In the case of the upstream glass sheet 334, after the average position of points A, B and C is determined, the hammock support assembly 220 is moved downstream in the direction indicated by arrow 338 so that leading edge 340 is superimposed over the leading edge 332 of the reference outline 330. In the case of downstream glass sheet 336, the hammock aupport assembly 220 moves upstream in the direction indicated by arrow 342 so that leading edge 344 is superimposed over the leading edge 332.

In the preferred embodiment of the invention, the motor 318 (see FIG. 10) is a stepper motor so that the programmable computer and controller 324 must determine the correct number of rotating steps to properly position the glass sheet G between the molds in the pressing station 24. The positioning accuracy of the vision sensor position system 66 is ±0.010 inches (±0.025 cm).

It is contemplated that the shuttling vacuum platen pickup 64 can operate with or without the vision sensor positioning system 66. When the system 66 is not employed, the pickup 64 deposits the heat softened glass sheets directly on the lower mold 34 or on a stationery glass support assembly similar to the hammock support assembly 220 of the positioning 212 but without the carriage slide assembly 222.

It should be noted that in practicing this invention, successive contact with and support of the hot glass sheets generally weaken the hammock material 252. In addition, the material becomes discolored and this discoloration can effect the vision sighting positioning system 66 by causing camera 322 to misidentify the edge of the glass sheet G. To overcome these problems, the hammock material 252 is periodically advanced by unlocking the racket assembles 280, 282, 284, and 286, indexing the supply roll 244 and take up roll 246, reengaging the rackets and stretching the material 252 taut. Rather than manually advancing the hammock material 252, it is readily apparent to one skilled in the art that a simple hammock roll advancing system (not shown) can be used to automatically index the rolls 244, 246, 248 and 250.

The sheet transfer means 28 at the cooling station 22 includes a ring-like member 346 similar to that in U.S. Pat. No. 4,285,715, whose teachings are hereby incorporated by reference, and is shown in FIGS. 1 and 2. The ring-like member 346 includes a support rail 348 that is disposed edgewise with its edge forming the supporting surface of the member 346. The rail 348 follows the contours of the shaped glass sheet and is spaced slightly inboard of the glass sheet perimeter. The glass sheet supporting surface of the rail 348 is preferably a nonmetallic material that can support the hot glass sheet without leaving a mark on the glass sheet surface or cause venting. The ring-like member 346 is supported by a reinforcing frame 350 and cohnected to a carriage 352 by strut members 354. The carriage 352 moves the member 346 from an upstream position wherein the member 346 is positioned in a shaping station 24 beneath the upper vacuum mold 36 to a downstream position wherein the member 346 is positioned between quenching nozzles in the cooling station 22.

The cooling station 22, which is similar to that taught in U.S. Pat. No. 4,285,715, includes longitudinally spaced transverse rows of spaced pipe nozzles 356 extending downward from an upper plenum 358 as shown in FIGS. 1 and 2. In opposing position to nozzles 356 are longitudinally spaced transversely extending lower bar type nozzle houses 360 on lower plenum 362. The bar type nozzle housings 360 are spaced vertically below the upper pipe nozzles 356 to provide clearance for moving the ring-like member 346 along a path therebetween. The lower ends of the rows of the pipe nozzles 356 are located along a curved surface complementary to the curved shape of the upper smooth surfaces of the bar-type housings 360 and are vertically spaced above the housing 360 to provide a curved clearance space between conforming to the transverse shape of the glass sheet conveyed therebetween. If desired, the plenums 358 and 362 can be sectionalized along the length of the cooling station 22 to provide different air pressures in the various sections of the upper plenum and of the lower plenum, and to provide a program of air blasts along the length of the cooling station 22.

In the preferred embodiment of the invention, the operating sequence is controlled by a Modicon Programmable Controller. A G.E. Programmable Controller is linked to the Modicon to control the glass sheet alignment sequence. In operation, a glass sheet G is conveyed through the furnace 20 over the conveying rolls 30 and heated to its heat softening temperature. In the preferred embodiment the glass sheet G is heated to approximately 1200° F.±(649° C.) depending on the difficulty of the bend. The glass sheet G activates the sensing element 32 and initiates the shaping sequence. In the preferred embodiment, the sensing element 32 is an optical sensor that starts the shaping sequence when the trailing edge of the glass sheet G passes the sensor by activating a timer and counter. The counter monitors the revolution of conveying rolls transferring the glass sheet G to establish its linear position in the conveying direction. The glass sheet G enters a high speed conveyor roll complement 364 to position the heat softened glass sheet G beneath the vacuum platen pickup 64 on the shuttle frame 62 which is in its park position at the exit end of the furnace 20. The platen pickup 64 is in a raised position with its lower apertured wall 104 approximately ½ inch to ¾ inches (1.27 cm to 1.91 cm) above the upper surface of the glass sheet G. The high speed conveyor roll complement 364 includes a "creep" or slow speed conveying mode controlled by the timer, activated by the sensor 32, to decelerate the glass sheet G and move it into position below the raised platen 64 at a slow speed. As the glass sheet G approaches the pickup point, the timer opens a vacuum valve (not shown) so that vacuum is drawn through the platen pickup 64 and to ensure that the desired vacuum is at full operating levels prior to engagement of the glass sheet G by the pickup 64. When the glass sheet G is at a predetermined location as set by the counter, the hydraulic circuit is activated and rotates the cams 140 to drop the free hanging frame 102 supporting the pickup 64 to a lowered position, which is preferably a minimum of 3/32 inches (0.24 cm) above the upper surface of the glass sheet G. The initial vacuum level is set at a level that will not lift the glass sheet G when the pickup 64 is in a raised position, but will lift the glass sheet G when the pickup 64 is in a lowered position. Depending on the configuration and thickness of the glass sheet G, the required vacuum level varies from approximately 1½ inches to 2 inches (3.81 cm to 5.08 cm) of water. The glass sheet G is lifted by suction into contact with the platen pickup 64. The lifting action of the platen 64 is almost instantaneous and although the preferred embodiment employs a creep mode prior to lifting, it is believed that the vacuum platen pickup 64 could accurately lift a heat softened glass sheet directly from a high speed roll complement.

After the glass sheet G is lifted and engaged by the pickup 64, the shuttle frame 62 is moved into the shaping station 64 via the drive racks 76 and 78, drive sprockets 80 and 82, and motor 86. As the shuttle frame 62 moves towards the unload position at the shaping station 24, the hydraulic circuit simultaneously rotates the cams 140 back towards their original position, lifting the free hanging frame 102, platen pickup 64 and the glass sheet G as they exit the furnace 20 to provide additional clearance between the glass sheet G and the conveyor rolls 364. If required, the vacuum in the platen pickup 64 is reduced during shuttling to the minimum level required to hold the glass sheet G. This throttling back of the vacuum helps eliminate any marking to the glass surface that may result from the vacuum suction.

The counter 88 on drive shaft 84 is a multifunction counter and establishes the deceleration and positioning of the shuttle frame 62 as it moves from the furnace 20 to the shaping station 24 and visa versa. As the counter 88 reaches the predetermined deceleration and stop count, it signals the Modicon to slow the platen pickup 64 with the adhered glass sheet G and stop it, respectively.

When the shuttle frame 62 is at the predetermined position between the lower mold 34 and upper vacuum mold 36, the counter 88 starts a vacuum cutoff timer. When the vacuum cutoff timer times out, the vacuum is released, and the glass sheet G is deposited on the fiberglass cloth 252 of the hammock support assembly 220. After a short delay to ensure that the glass sheet G has dropped, the shuttle frame 62 reverses direction and travels back into the furnace 20 to its parked position.

The glass sheet G on the hammock support assembly 220 tends to conform to the sag of the fiberglass cloth 252. The sagging of the glass sheet G should be kept to a minimum in order to prevent the glass sheet G from sagging into the lower mold 34 before the vision sensor positioning system 66 can reposition it prior to pressing. To minimize sag, the fiberglass cloth 252, is tightly stretched between rolls 248 and 250.

As the shuttle frame 62 moves back to the furnace 20, the camera 322 "takes a picture" of the leading edge of the hot glass sheet G. If the edge is not at the predetermined home position on the fiberglass cloth 252, the programmable controller 324 linked to the camera 322 activates the motor 318 of the carriage slide assembly 222 to move the upper plate 300 over the lower plate 302 and longitudinally slide hammock support assembly 220 as previously discussed, so that the glass sheet G is directly positioned between the pressing molds. Simultaneously with the sliding action, the lower mold 34 and the upper vacuum mold 36 rapidly accelerate towards one another with the supported glass sheet G therebetween. Hydraulically controlled deceleration ramps are used to slow down the movement of the molds prior to final pressing to provide more control during the critical pressing action. It should be noted that the hammock support assembly 220 moves vertically along with the lower mold 34 and that the upper mold 36 presses down through the hammock support assembly 220 and into the lower mold 34. The stretching of the hammock material 252 as the upper vacuum mold 36 presses the glass sheet G down into the lower mold 34 prematurely wears the material 252, reducing it effective service life, especially in parts with sharp corners. To reduce this wear, the previously discussed hammock rolls advancing system could be modified to untension the hammock material 252 to coincide with the pressing of the glass sheet G between the molds 34 and 36.

During pressing, vacuum is supplied to the vacuum chamber of the upper vacuum mold 36 to hold the shaped glass sheet G against the apertured lower wall 50 so that the glass sheet G will remain in contact with the lower wall 50 when the lower mold 34 is retracted. After a mold press timer controlling the amount of time the molds 34 and 36 press the glass sheet G times out, the molds retract with suction still being applied to hold the glass sheet G against the upper vacuum mold 36. Shaping station 24 is now ready to receive the ring-like member 346. After a carriage delay timer activated as the mold press timer times out, the member 348 moves upstream from the cooling station 22 and is positioned beneath the upper vacuum mold 36. When the member 346 is in position, the vacuum in the upper mold 36 is released, permitting the shaped glass sheet G to be deposited onto the member 346.

The glass sheet G is transferred downstream to the cooling station 22 where it is quenched to impart at least a partial temper in the shaped glass sheet. The glass sheet G is then transferred to a cooling conveyor (not shown) for further cooling.

The movement of the shuttle frame 62, the hammock support assembly 220, the molds 34 and 36 and the ring-like member 346 are synchronized so that there is no interference between their respective operations. Ideally, the camera 322 sights the edge of the sheet G as soon as the shuttle frame 62 moves out of its line of sight and the alignment of the sheet G immediately follows. The alignment must be complete before the molds 34 and 36 make pressing contact with the sheet G. Furthermore the molds 34 and 36 can be moving prior to the shuttle frame 62 moving out of the shaping station 24 as long as the frame 62 and molds 34 and 36 do not interfere with each others respective movement. Similarly the member 346 can start to move from the cooling station 22 towards the shaping station 24 before there is adequate room for the member 346 between the molds 34 and 36 as long as the molds are sufficiently spaced apart when the member 346 arrives. Limit switches (not shown) positioned along the vertical paths of the molds 34 and 36 and/or the horizontal paths of the shuttle frame 62 and ring-like member 346 can be used to ensure that the operation sequence proceeds without interference.

The heating and shaping apparatus of the present invention provides a method of transferring glass sheet G from a furnace 20 to a shaping station 24 with full face upper and lower molds. The molds provide full surface contact between the glass sheets and the shaping surfaces to facilitate the complex shaping of heat softened glass sheets that is not possible when using drop forming, deformable molds, or segmented lower lifting mold techniques. The combination of the shuttling vacuum platen pickup 64 with the vision sensor positioning system 66 provide the retrieval/positioning system 26 with a method of rapidly moving glass sheets and accurately positioning the sheets between the upper and lower molds so as to correct for all upstream linear positioning variations. Without the present invention, glass sheets conveying rates must be reduced prior to each transfer operation to ensure proper glass sheet positioning after the transfer. With the present invention, transfer accuracy is sacrificed for conveying speed. At the final transfer from the furnace 20 to the shaping station 24, the present invention detects and determines the cumulative linear misalignment immediately prior to final pressing and corrects it. This capability adds to the throughput of a glass sheet bending process by allowing glass sheets to be conveyed and transferred at higher rates. These faster conveying rates may add to the cumulative linear misalignment but the present system corrects all the linear misalignment in one step. The final realignment takes less time than the total conveying and transfer time saved by increasing the conveying rate.

The form of the invention shown and described in this disclosure represents an illustrative preferred embodiment thereof. It is understood that the gist of the invention is defined in the claimed subject matter which follows and that various modifications of this invention which become obvious in light of a reading of the description of this specification are incorporated therein.

We claim:

1. A glass sheet-shaping apparatus comprising:
    means to heat said glass to its heat softening temperature;
    means to engage said glass sheet within said heating means;
    means to move said engaging means and said heat-softened sheet engaged therewith to a shaping station having shaping mold means;
    means to support said glass sheet at said shaping mold means of said shaping station;
    means to deposite said glass sheet on said support means; and
    means to horizontally position said support means with said glass sheet supported thereon within said shaping station to align said sheet relative to said shaping mold means.

2. The apparatus as in claim 1 wherein said shaping mold means includes a pair of vertically aligned, upper and lower shaping molds and further wherein said support means is positioned between said upper and lower molds.

3. The apparatus as in claim 2 wherein said support means includes a slide frame positioned at said shaping station and further wherein said positioning means includes means to move said slide frame within said shaping station, means to locate said sheet while supported on said slide frame, and means responsive to said locating means acting on said slide frame moving means to move said slide frame with said glass sheet supported thereon to a predetermined position within said shaping station.

4. The apparatus as in claim 3 wherein said slide frame includes a heat resistant cloth extending in a generally horizontally planar direction across said slide frame and further including means to maintain said cloth taut across said slide frame so as to reduce sag of said glass sheet supported thereon.

5. The apparatus as in claim 4 wherein said engaging means is a vacuum pickup with a downwardly facing glass sheet engaging surface and said vacuum pickup moving means includes a shuttle frame with said vacuum pickup suspended therefrom, and further including means to vertically reciprocate said vacuum pickup.

6. The apparatus as in claim 5 wherein said reciprocating means includes a plurality of lifting members position around the perimeter of said pickup such that when said lifting members are in a first position, said pickup engaging surface in a first position relative to said glass sheet within said heating means and when said lifting members are in a second position said pickup engaging surface is in a second position relative to said glass sheet.

7. The apparatus as in claim 5 wherein said vacuum pickup shuttle frame includes a support frame having an enclosed passageway and means to connect said passageway of said support frame with said pickup such that said pickup, connecting means, and passageway of said support frame are interconnected by a continuous passage.

8. The apparatus as in claim 7 wherein said connecting means maintains connecting contact between said pickup and said support frame throughout the vertical movement range of said pickup.

9. The apparatus as in claim 8 further including means to couple said passageway of said support frame with a vacuum source.

10. The apparatus as in claim 8 wherein said shuttle frame is capable of expanding without warping as said shuttle frame moves from within said heating means to shaping station and is subjected to variations in its thermal environment.

11. A glass sheet shaping apparatus comprising:
means to heat said glass sheet to its heat softening temperature;
a shaping station with a shaping mold means for shaping the heat softened glass sheet,
a vacuum pickup to engage said glass sheet within said heating means;
a vacuum pickup support frame including an enclosed passageway;
a connecting arm extending between said passageway in said support frame and said pickup such that said pickup, connecting arm, and passageway of said support frame are interconnected by a continuous passage; and
means to move said vacuum pickup support frame and said heat softened glass sheet engaged therewith to said shaping mold means of said shaping station.

12. The apparatus as in claim 11 wherein said connecting arm extends from said passageway of said support frame and terminates in close proximity to said pickup.

13. The apparatus as in claim 12 further including means to vertically reciprocate said vacuum pickup on said support frame.

14. The apparatus as in claim 13 wherein said connecting arm maintains said continuous passageway between said pickup and said support frame passageway throughout the vertical movement range of said pickup.

15. The apparatus as in claim 14 wherein said support frame is capable of expanding without warping as said frame moves from within said heating means to sahd shaping station and is subjected to variation in its thermal environment.

16. The apparatus as in claim 15 wherein said shaping mold means includes an upper vacuum mold vertically aligned with a lower mold at said shaping station and said moving means move said vacuum pickup between said upper and lower molds and further including a tempering ring moveable from a cooling station, downstream from said shaping station, into said shaping station and between said molds and beneath said shaped glass sheet when said glass sheet is held against said upper mold by vacuum and said molds are in a separated position.

17. Method of shaping a glass sheet comprising:
heating said sheet to its heat softening temperature in a cavity;
engaging said glass sheet within said cavity with a lifting means;
transferring said glass sheet and lifting means to a shaping station having a mold means;
depositing said glass sheet on a sheet support at said mold means to support said sheet;
moving said sheet support with said glass sheet supported thereon within said shaping station to align said glass sheet relative to said mold means; and
shaping said glass sheet while supported on said sheet support.

18. The method as in claim 17 wherein said engaging step includes applying a vacuum through a downwardly facing surface of a vacuum pickup positioned adjacent an upper major surface of said glass sheet, said vacuum sufficient to lift said glass sheet into contact with sad pickup and hold it thereagainst.

19. The method as in claim 18 wherein said moving step includes identifying at least one reference indicator on said glass sheet to indicate the location of said glass sheet on said sheet support and moving said sheet support with said glass sheet suported thereon to align said reference indicator with a predetermind reference indicator position.

20. The method as in claim 19 wherein said mold means includes a set of vertically aligned upper and lower pressing molds as said shaping stations and further including the steps of positioning a cloth portion of said sheet suport between said upper and lower molds to support glass sheet and periodically replacing said cloth.

21. The method as in claim 20 wherein said moving step includes the steps of moving said sheet support within a plane between said molds at said shaping station and rotating said sheet support about axis generally perpendicular to said plane.

22. The method as in claim 21 wherein said upper mold is a vacuum mold and further including the steps of maintaining engagement of said shaped glass sheet with said upper vacuum mold after said shaping step, transferring said shaped glass sheet to a tempering ring, and moving said tempering ring into a cooling station wherein said shaped glass sheet is cooled at a sufficient rate as to in part at least a partial temper in said glass sheet.

* * * * *